United States Patent [19]

Hopkins

[11] Patent Number: 5,485,265
[45] Date of Patent: Jan. 16, 1996

US005485265A

[54] VEHICLE HEADLIGHT AIMING APPARATUS

[75] Inventor: Evan L. Hopkins, Emporia, Kans.

[73] Assignee: Hopkins Manufacturing Corporation, Emporia, Kans.

[21] Appl. No.: 300,283

[22] Filed: Sep. 2, 1994

[51] Int. Cl.$^6$ .................................................. G01J 1/00
[52] U.S. Cl. .................................................. 356/121
[58] Field of Search .............................................. 356/121

[56] References Cited

U.S. PATENT DOCUMENTS

| | | | |
|---|---|---|---|
| 3,077,139 | 2/1963 | Todd et al. | |
| 3,386,333 | 6/1968 | Preston | |
| 3,467,473 | 9/1969 | Preston | 356/121 |
| 3,515,483 | 6/1970 | Irwin | 356/121 |
| 3,532,432 | 10/1970 | Mansour | 356/121 |
| 3,709,609 | 1/1973 | Spengler et al. | 356/155 |
| 3,746,449 | 7/1973 | Shick | 356/121 |
| 3,791,740 | 2/1974 | Proefrock | 356/121 |
| 4,185,298 | 1/1980 | Billet et al. | |
| 4,435,078 | 3/1984 | de Brabander et al. | 356/121 |
| 4,609,939 | 9/1986 | Kozawa et al. | 356/121 |
| 4,647,195 | 3/1987 | Ishikawa et al. | 356/121 |
| 4,679,935 | 7/1987 | Fukuda et al. | 356/121 |
| 4,744,655 | 5/1988 | Sdika | 356/121 |
| 4,948,249 | 8/1990 | Hopkins et al. | 356/121 |
| 4,973,155 | 11/1990 | Masuda | 356/121 |
| 5,164,785 | 11/1992 | Hopkins et al. | 356/121 |

FOREIGN PATENT DOCUMENTS 57-59125  4/1982  Japan.

OTHER PUBLICATIONS

Hopkins Manufacturing Corporation, 428 Peyton, Emporia, Kans. 66801-1158, HOPPY Vison 1 Image Processing Headlamp Aimer Instruction Manual, Copyright 1993, p. 1.

*Primary Examiner*—F. L. Evans
*Attorney, Agent, or Firm*—Hovey, Williams Timmons & Collins

[57] ABSTRACT

An improved vehicle headlight aiming apparatus is provided. The vehicle headlight aiming apparatus includes a reflective surface, a light intensity sensing device, and a light intensity comparator. The reflective surface is provided for receiving a light beam and reflecting a reflected lightbeam therefrom. The light intensity sensing device measures the pattern and intensity of the reflected lightbeam. The comparator compares the pattern and intensity of the reflected lightbeam to a known standard in order to provide headlight adjustment information. The comparator includes a plurality of externally-accessible plug-in memory modules for storing different headlight aiming standards. These plug-in memory modules are coupled to the comparator by way of a plurality of sockets mounted on the exterior of the comparator. A plug-in extension model having a serial communication port is also provided for coupling the comparator to external devices such as a printer or other computer equipment.

15 Claims, 6 Drawing Sheets

VEHICLE HEADLIGHT AIMING APPARATUS

BACKGROUND OF THE INVENTION

1. Field of the Invention

The present invention relates to vehicle headlight aiming devices, and more particularly to a vehicle headlight aiming apparatus which measures the pattern and intensity of a light beam projected from a vehicle headlight and compares it to one of a plurality of known headlight aiming standards to provide accurate aiming information. The invention includes interchangeable software structure which allows the apparatus to be upgraded to communicate with various software programs and input and output devices.

2. Description of the Prior Art

Vehicle headlight aiming devices are known in the art. For example, U.S. Pat. Nos. 4,948,249 and 5,164,785, which are owned by the assignee of the present invention, disclose two methods of aiming a vehicle headlight. These patents are hereby incorporated into the present patent application by reference.

These types of prior art headlight aiming devices generally include a reflective surface and a lens for focusing a headlight beam on the reflective surface, a light sensing device for measuring the pattern and intensity of the reflected lightbeam, and a comparator for comparing the reflected lightbeam to a known headlight aiming standard. If the headlight is improperly aimed, the comparator provides an error message including corrective instructions The operator then mechanically adjusts the headlight until its light beam is properly aimed.

Although prior art headlight aiming devices provide for accurate headlight measurement, they suffer from several limitations which limit their utility. For example, prior art devices cannot easily switch from one known headlight aiming standard to another. Various headlight aiming standards exist for cars manufactured in different countries and for different types of vehicles manufactured in the U.S. For example, headlights of vehicles manufactured in the U.S. are often aligned in accordance with standards set by the Society of Automotive Engineers (SAE). In contrast, many European manufactured vehicles have headlights with distinctly different beam patterns that require a different aiming standard.

The comparators of prior art devices typically include software containing a single headlight aiming standard. Often the headlight aiming standard is stored on an EPROM computer chip which is directly connected to the motherboard of the comparator. Thus, if the operator of prior art headlight aiming device wishes to switch from one standard to another, he must take the comparator apart and change EPROM chips. This operation is time consuming and difficult for mechanics lacking computer experience. This operation is also dangerous because it exposes the mechanic to electrical shocks. Moreover, frequent switching of EPROMs often damages the internal circuitry of the aiming device.

A similar disadvantage of prior art headlight aiming devices is that they do not utilize headlight aiming standards written in languages other than English. Since many mechanics are fluent in languages other than English, these prior art devices are difficult to use.

Another drawback of prior art headlight aiming devices is that they cannot be easily upgraded to communicate with various software and different types of external devices. Prior art headlight aiming devices typically include a standard RS232 serial port for coupling with external devices. Although this serial port allows limited communication with external devices, it cannot be upgraded to allow additional communication capabilities.

Thus, the prior art points out the need for an improved headlight aiming device which overcomes these and other limitations.

SUMMARY OF THE INVENTION

The present invention overcomes the limitations recited above and provides a distinct advance in the state of the art. The preferred invention relates to an improved vehicle headlight aiming apparatus which can easily switch from one headlight aiming standard to another. The preferred vehicle headlight aiming apparatus broadly includes a reflective surface, a light intensity sensing device, and a light intensity comparator. The invention also includes interchangeable software structure which allows the apparatus to be upgraded to communicate with various input and output devices.

The reflective surface includes a lens and a reflective screen. To aim a headlight, a vehicle's headlight beam is aligned with the aiming device and focused through the lens onto the reflective screen. The light intensity sensing device measures the pattern and intensity of the reflected lightbeam with a conventional charged coupled array and converts this pixel information into digital format. The comparator receives the digital data and compares the pattern and intensity of the reflected lightbeam to a known standard. If the headlight is not accurately aimed, the comparator provides an error message with instructions for proper alignment. By following these error instructions, the operator can manually reposition the headlight so that it is properly aligned. The comparator may also be coupled to a video monitor which superimpose the headlight beam on a grid so that the operator can visually inspect the alignment of the headlight during adjustment.

The invention includes interchangeable software structure which allows the apparatus to be upgraded to communicate with various software programs and input and output devices. This structure allows the comparator to communicate with external memory devices such as conventional computer disks, compact disks, or EPROM memory devices. These external memory devices allow the headlight aiming apparatus to be continually upgraded. For example, the external memory devices can provide multiple aiming standards to the comparator and can allow the comparator to communicate with external devices such as printers and other computers.

In preferred forms, the interchangeable software structure includes a plurality of externally-accessible sockets or receptacles configured for receiving memory devices such as plug-in modules. A plurality of plug-in memory modules are provided to couple with these sockets. These plug-in memory modules each include a different headlight aiming standard for use with the comparator. The memory modules each include a memory device such as an EPROM chip which communicates with the comparator to provide a headlight aiming standard for the comparison step. The plug-in memory modules allow the operator to quickly and easily switch the comparator from one headlight aiming standard to another. Advantageously, the plug-in memory modules may contain headlight aiming standards written in a variety of languages. For example, a separate memory module may be provided for a U.S. standard written in Spanish.

In particularly preferred forms, a plug-in extension module having a communication port is provided which couples with the external sockets of the comparator. These plug-in extension modules couple the comparator to external devices such as a printer or other computer equipment.

By providing this construction, numerous advantages are obtained. For example, the present headlight aiming device allows the operator to accurately aim a headlight in accordance with known headlight standards designed for automobiles built in different countries. This allows the same headlight aiming apparatus to be used on a variety of vehicles and sold and used in numerous countries. Additionally, the present headlight aiming device allows the operator to quickly and easily switch from one headlight aiming standard to another without accessing the internal circuitry of the device.

Another advantage is that the invention provides the capability of using headlight aiming standards written in various languages.

The headlight aiming device could also be personalized for particular automobiles. For example, a separate plug-in module could be provided for a particular make and model of car. In this way, more precise headlight aiming could be obtained for a particular car.

Another advantage is that the aiming device may be easily coupled to other devices with the plug-in extension module. This allows the device to be easily upgraded to accommodate future improvements. This also allows the operator to obtain printed documentation of the aiming tests and allows the comparator to download statistical information to other computing devices.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENTS

Figure 1:
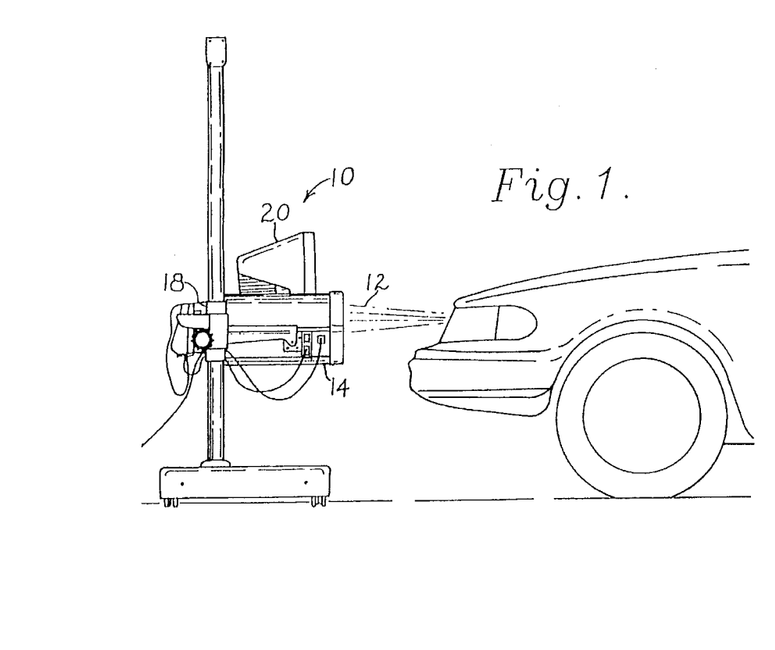
FIG. 1 is a perspective view of a headlight aiming apparatus constructed in accordance with the preferred embodiment.

Turning now to the drawings, and particularly FIG. 1, a headlight aiming apparatus 10 constructed in accordance with the preferred embodiment is illustrated. The preferred headlight aiming apparatus broadly includes a reflective surface 12 including a lens and a reflective screen for receiving the light beam from a vehicle headlight, a light sensor apparatus for measuring the light beam pattern and intensity of the reflected light, and a comparator 14 for comparing the light pattern and intensity of the reflected light to a known headlight aiming standard. The preferred headlight aiming apparatus is a Vision 1 system manufactured by Hopkins Manufacturing Corporation. As those skilled in the art will appreciate, other types of headlight aiming devices may be incorporated in the present invention.

The components of the headlight aiming apparatus are supported by a conventional support structure 18. The support structure can be adjusted both vertically and horizontally to facilitate aiming of headlights on a variety of vehicles.

In more detail, the reflective surface 12 includes a conventional lens and a reflective screen. The lens is preferably a double convex converging or Fresnel lens. Society of Automotive Engineers (SAE) standards recommend that the headlight beam be imaged on a surface 25 feet from the headlight. Accordingly, the focal length of the lens is chosen so that an apparent distance of 25 feet is obtained. The reflective screen may be any commercially available screen.

As illustrated in FIG. 1, the lens is positioned opposite a vehicle headlight by adjusting the support structure 18 in a conventional manner. During headlight testing, the lens focuses an image of the headlight beam on the reflective screen, and the screen reflects a reflective image of the headlight beam therefrom. As described in detail below, the beam pattern and intensity of this reflected image is measured and compared to a known standard to obtain proper headlight alignment information.

The light sensor apparatus is provided for sensing the reflected headlight image from the screen. The preferred light sensor apparatus is a conventional image sensor and includes a matrix of photo-sensitive cells. In the preferred embodiment, the image sensor is a charged coupled device (CCD) such as commercially available from Texas Instruments, Model No. TC211. The light sensor is positioned behind the reflective screen and a lens images light from the reflective screen onto the light sensor. The light sensor measures the beam pattern and intensity of the light beam incident on the photo-sensitive matrix and produces an analog electrical signal representative of the light beam. The signal is in analog pixel format and indicates the cell location and the light intensity in that cell. In preferred forms, the light sensor is coupled to a conventional analog to digital converter for converting the analog pixel data to digital form for future processing by the comparator.

Figure 8:
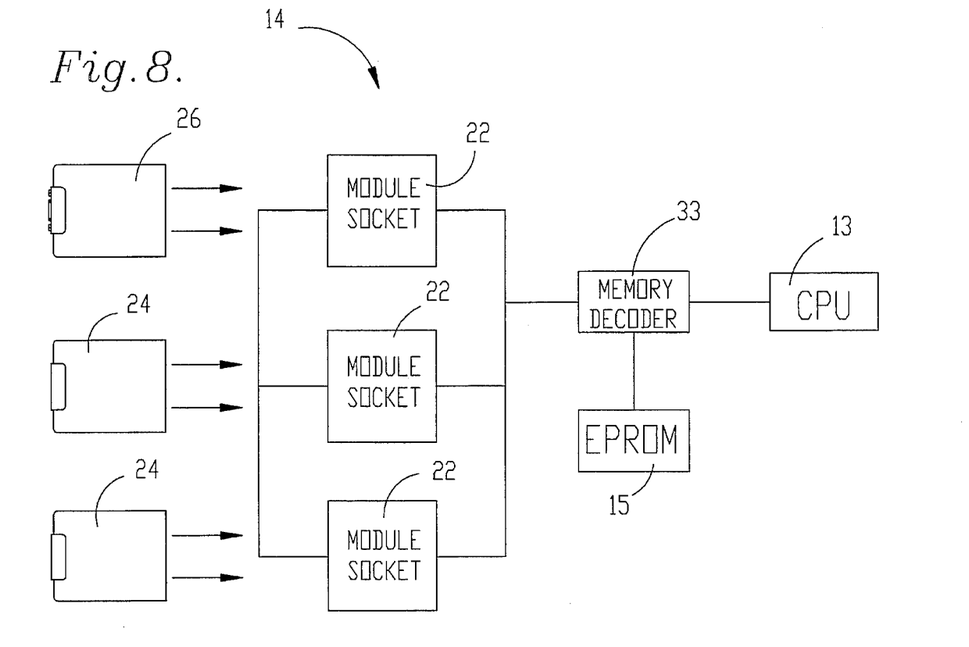
FIG. 8 is a block diagram of the headlight aiming apparatus illustrating the connection of a plurality of plug-in modules to the comparator.

The comparator 14 is provided for processing the image data from the light sensor and comparing it to a known headlight aiming standard to determine the accuracy of the headlight aim. The comparator is preferably a microprocessor programmed with conventional software containing known headlight aiming standards. As illustrated in FIG. 8, the comparator includes an internal CPU 13 for controlling its computing functions and an internal memory device such as an EPROM chip 15 for storing a known headlight aiming standard. The comparator is coupled to the light sensor and receives the digital imaging data corresponding to the beam pattern and intensity of the headlight.

The comparator 14 compares the measured beam pattern and intensity of the reflected lightbeam to a known standard to determine if the headlight is properly aligned. If the headlight is out of alignment, the comparator produces an error signal indicating the amount and direction by which the headlight is incorrectly aimed. With this information, the operator can manually adjust the headlights until they are properly aligned.

As illustrated in FIG. 1, the comparator may be coupled to a conventional CRT monitor 20 for displaying the reflected headlight beam and any error messages generated by the comparator. The monitor superimposes the reflected beam over a grid to allow the operator to observe the displacement of the headlight from its proper aiming position. In this way, the operator can observe the monitor while manually aiming the headlight.

The invention includes interchangeable software structure which allows the apparatus to be upgraded to communicate with various software programs and input and output devices. This structure allows the comparator to communicate with external memory devices such as conventional computer disks, compact disks, or EPROM memory devices. These external memory devices allow the headlight aiming apparatus to be continually upgraded. For example, the external memory devices can provide multiple aiming standards to the comparator and can allow the comparator to communicate with external devices such as printers and other computers.

The preferred interchangeable software structure includes a plurality of externally-accessible sockets 22 or receptacles for receiving a variety of different input devices such as plug-in modules. As illustrated in FIG. 8, these sockets are electrically coupled to the internal CPU 13 and EPROM 15 of the comparator 14. As described in detail below, the sockets are configured for coupling with a plurality of different plug-in modules including memory modules 24 and expansion modules 26. The plug-in modules are provided for incorporating different headlight aiming standards into the comparator and for coupling the comparator to external devices such as a printer or other computer.

Figure 3:
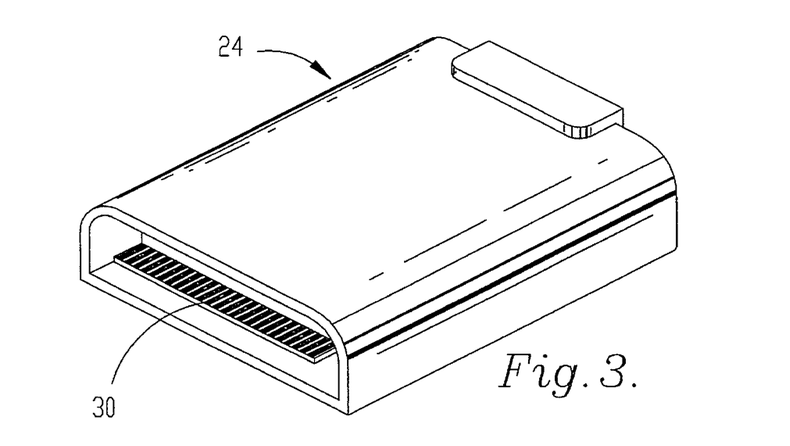
FIG. 3 is a top perspective view of a plug-in memory module.
Figure 5:
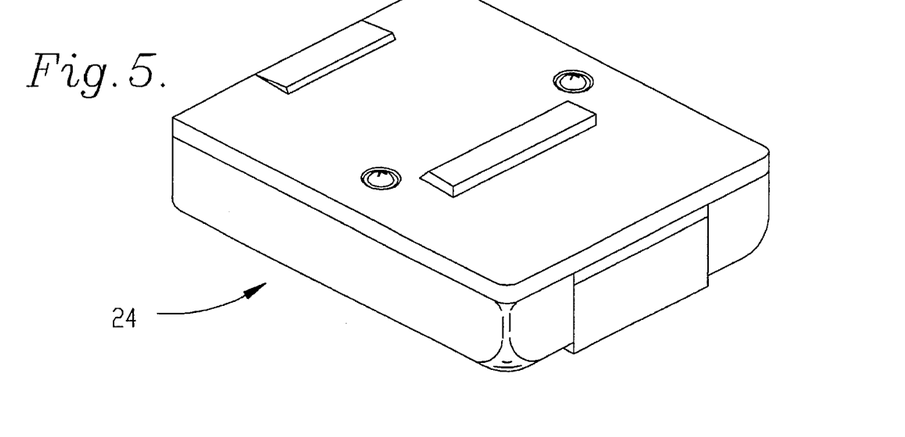
FIG. 5 is a bottom perspective view of a plug-in memory module.
Figures 6, 7:
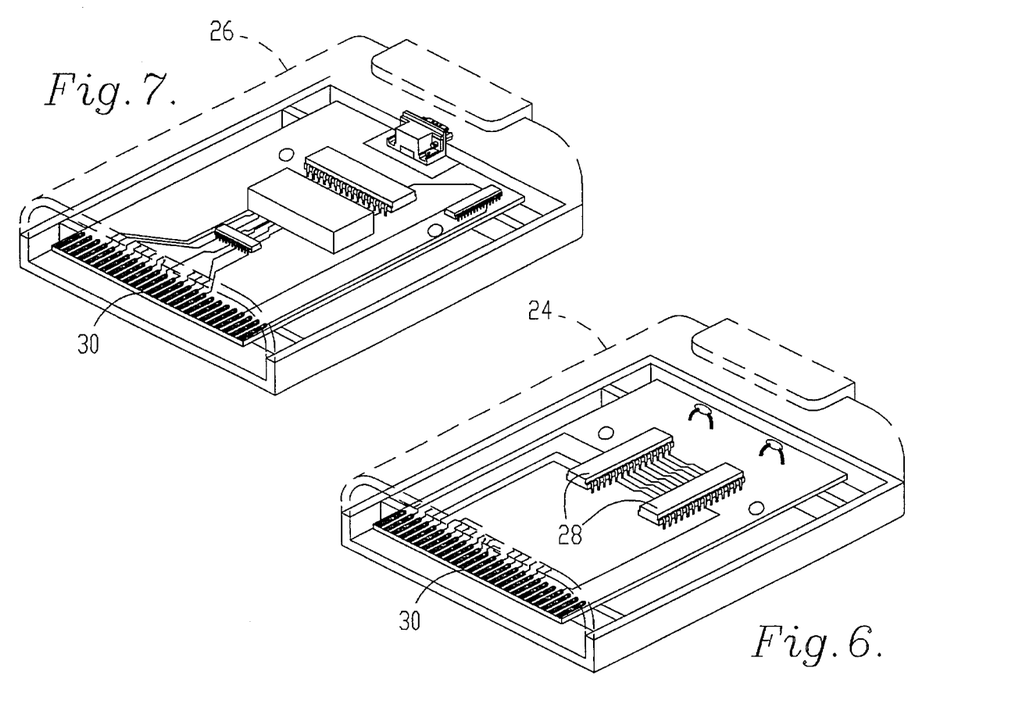
FIG. 6 is a sectional view of a plug-in memory module illustrating the internal circuitry of the module.
FIG. 7 is a sectional view of a plug-in extension module illustrating the internal circuitry of the module.

One type of module which can be received in the comparator sockets is a plug-in memory module 24. The plug-in memory modules are provided for storing various headlight aiming standards and for incorporating these standards into the comparator 14. A typical plug-in memory module 24 is illustrated in FIGS. 3, 5 and 6. As best illustrated in FIG. 6, each memory module includes one or more memory devices such as EPROM memory chips 28 for storing a known headlight aiming standard. For example, one memory module may store a headlight aiming standard for European countries or Japan, whereas a second memory module may store an aiming standard compatible with U.S. regulations.

Advantageously, the plug-in memory modules may contain headlight aiming standards written in a variety of languages. For example, a separate memory module may be provided for a U.S. standard written in Spanish. The memory modules may also include a demonstration module for storing a demonstration software program and a training module for storing a training software program.

Figure 2:
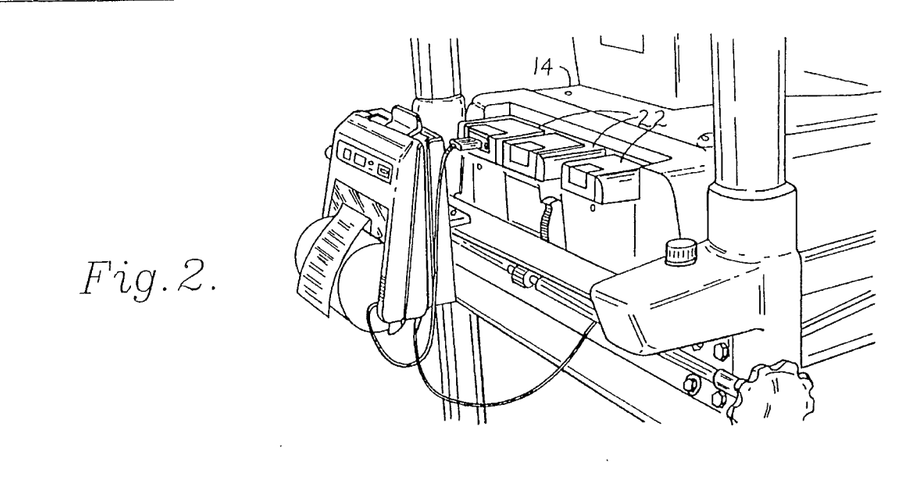
FIG. 2 is a rear view of the comparator apparatus of the present invention illustrating the plug-in memory modules and extension module.
Figure 9:
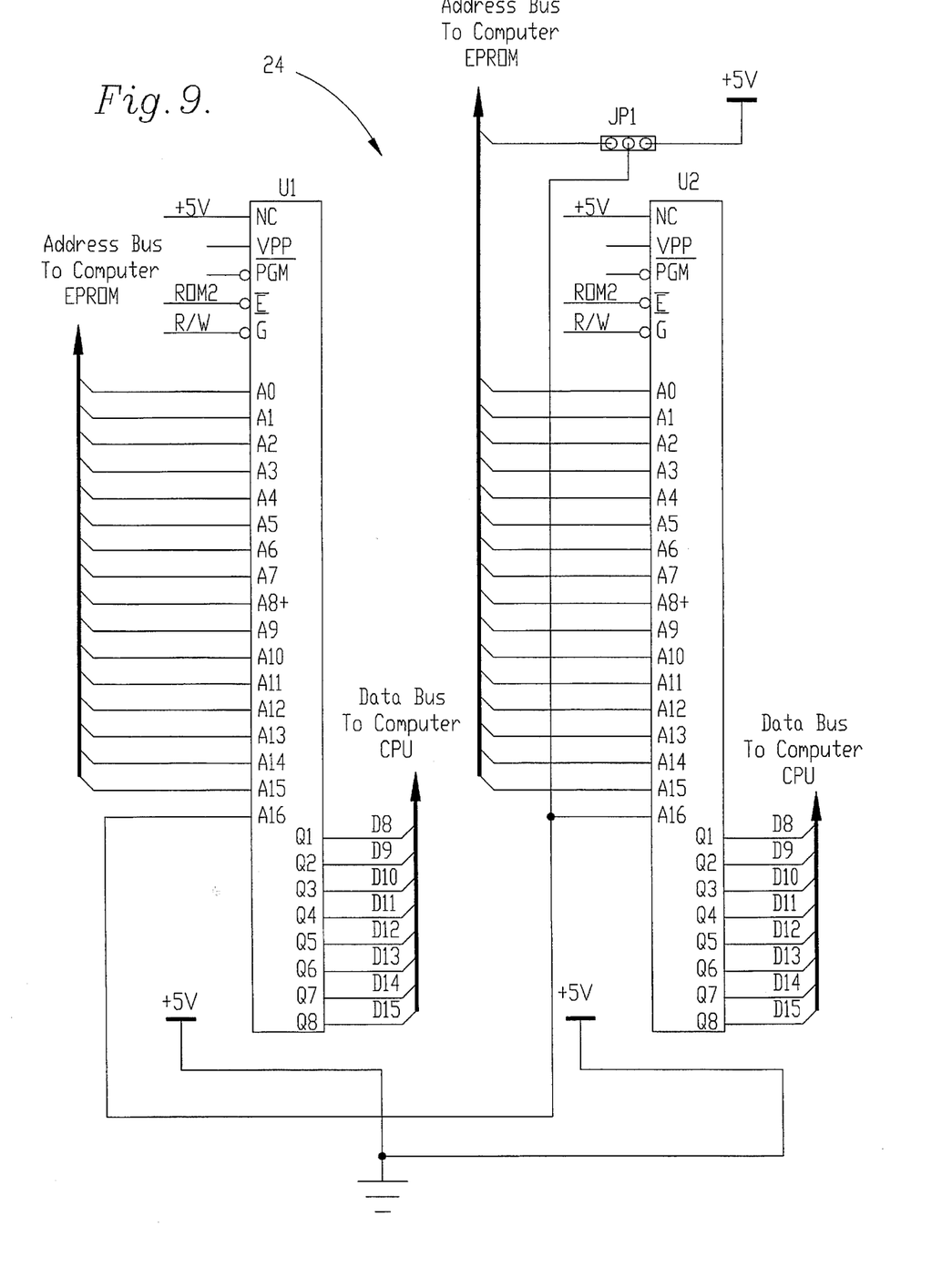
FIG. 9 is a pin diagram illustrating the pin layout of a plug-in memory module.

As illustrated in FIG. 6, the memory devices or EPROMs 28 on a memory module are connected to a conventional circuit board having a 50-pin electrical connector 30. As illustrated in FIG. 2, the connector 30 couples the memory module 24 to one of the external sockets 22 on the comparator 14. FIG. 9 illustrates the pin layout of a typical memory module.

FIG. 8 is a block diagram illustrating the connection of several plug-in memory modules 24 and expansion module 26 to the comparator 14. Once the modules are inserted into a socket 22, the CPU 13 can access the information, algorithms and software stored in these modules. Thus, if a plug-in memory module containing a U.S. headlight aiming standard is stored in the comparator, the comparator will execute the commands in the module so that it compares the light pattern and the intensity with this standard. To switch from one aiming standard to another, the operator merely removes the plug-in memory module and replaces it with another memory module. In the case of an expansion module 26, the CPU can communicate through the module with other external devices such as printers and personal computers. To switch devices or to communicate with more devices one merely adds or changes expansion modules.

As those skilled in the art will appreciate, the preferred comparator could be provided with structure for simultaneously receiving a plurality of different known headlight aiming standards. In this way, the operator could insert more than one memory module into the sockets of the comparator and selectively switch between headlight standards stored on the different modules.

A second type of module which can be received in the comparator sockets is a plug-in extension module 26. The plug-in extension module 26 is configured for coupling the comparator to external devices such as a printer or other computer. A typical plug-in extension module 26 is illustrated in FIGS. 4 and 7.

Figure 4:
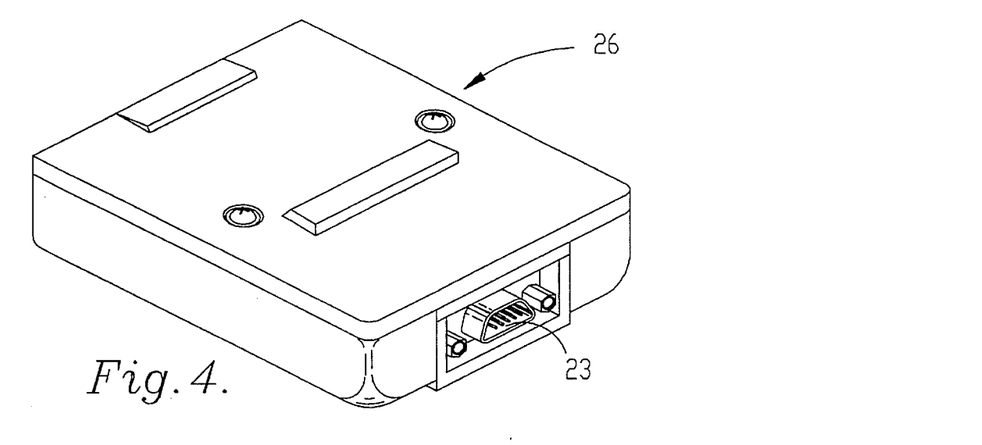
FIG. 4 is a bottom perspective view of a plug-in extension module.
Figure 10A:
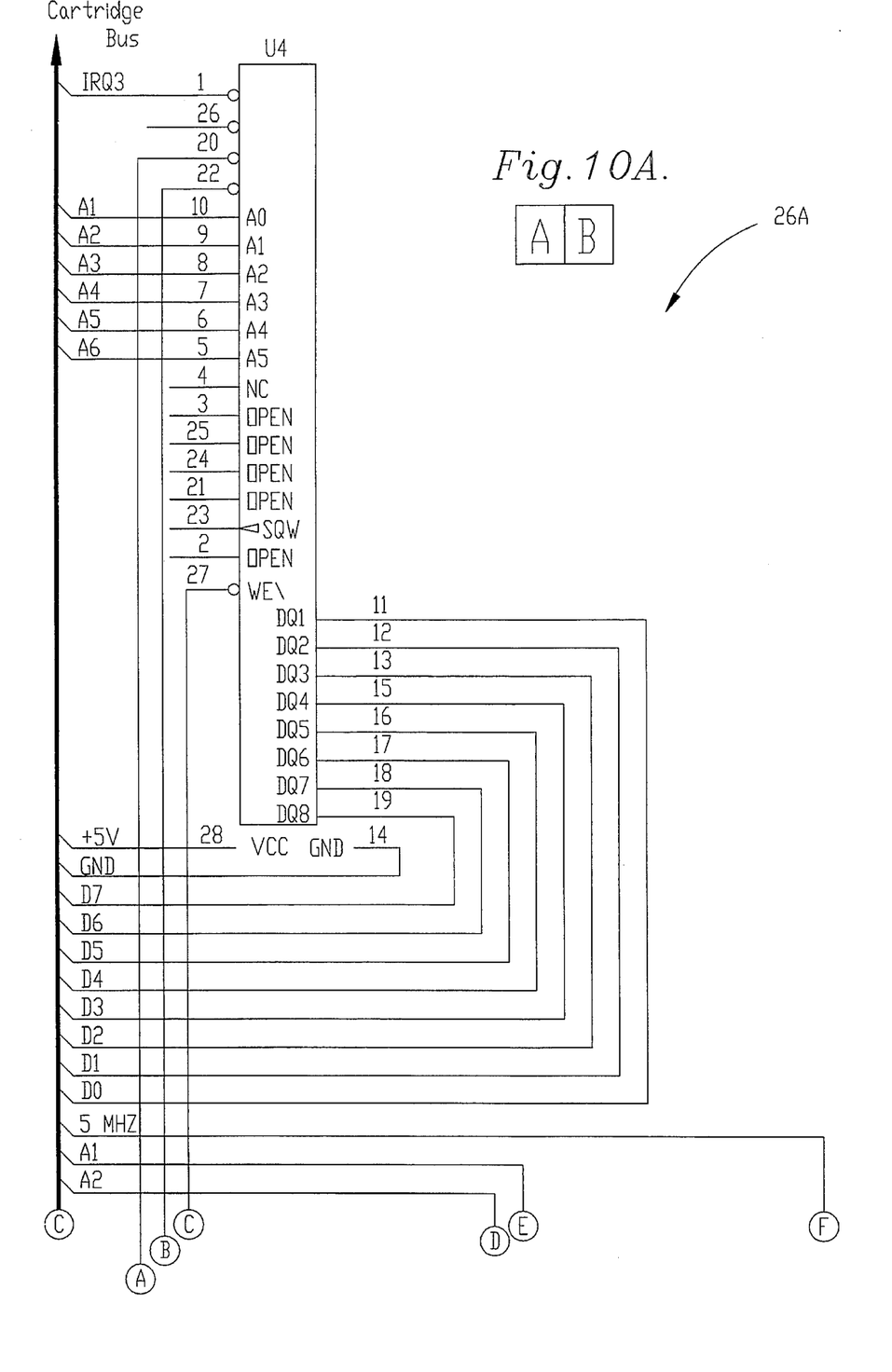
FIG. 10A is a partial pin diagram illustrating the pin layout of a plug-in extension module.
Figure 10B:
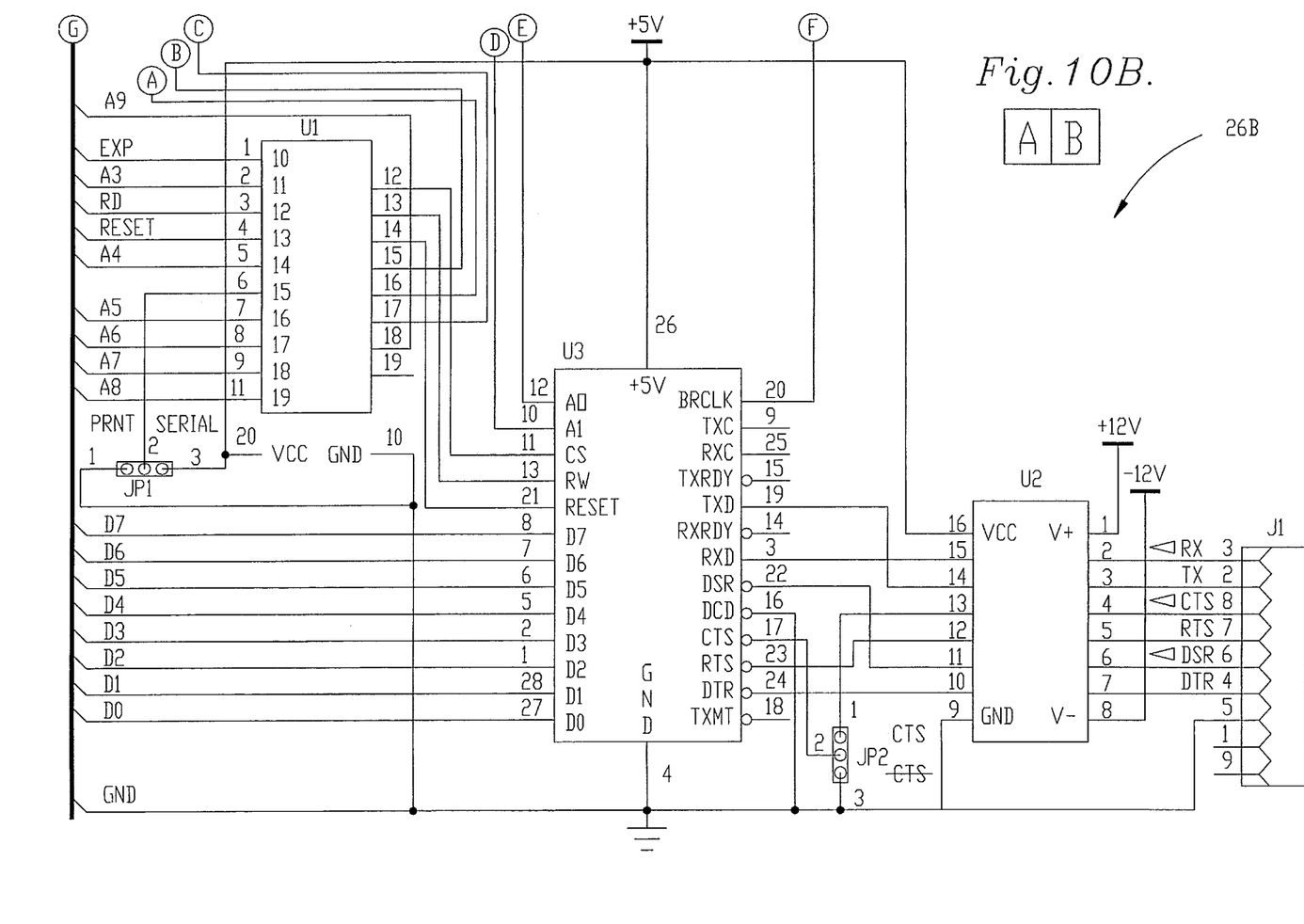
FIG. 10B is a continuation of FIG. 10A illustrating the pin layout of a plug-in extension module.

As illustrated in FIG. 4, the plug-in extension module 26 includes a communication port 32 such as an RS232 serial connection port, an RS422 port, a parallel communication port, a port of the type manufactured by the Centronics Corporation, or other similar communication ports. The extension module also includes a 50-pin electrical connector 30 for coupling the extension module to the external sockets of the comparator. FIGS. 10A and 10B illustrate the pin layout of a typical memory module.

FIG. 8 is a block diagram illustrating the connection of several plug-in memory modules 24 and a plug-in extension module 26 to the comparator 14. Once an extension module 26 is inserted into a socket 22, the CPU 13 of the comparator communicates through the module with other external devices such as printers and personal computers.

The plug-in extension module is configured to operate as either a printer extension module or as a serial communication module. As illustrated in FIG. 10B, a jumper JP1 is provided on the extension module for switching between these modes. When the jumper is set to the print mode, the connection port 32 allows the comparator to communicate with a conventional printer. FIG. 2 illustrates such a connection. When the extension module is set to this mode, the operator of the headlight aiming device can obtain a hard copy of the headlight aiming data for documentation purposes. Alternatively, the jumper can be set to the serial communication mode. In this mode, the comparator can communicate with other computer equipment. This allows the user to download aiming data to other computer equipment for statistical analysis and record compilation.

As those skilled in the art will appreciate, numerous other externally-accessible memory devices could be incorporated into the present invention. For example, the known headlight aiming standards could be stored on conventional floppy disks or compact disks and the comparator could be equipped with a conventional floppy disk drive or compact disk drive.

In operation, the preferred headlight aiming device allows an operator to quickly and easily aim a vehicle's headlight. Moreover, the device allows an operator to quickly and easily switch from one headlight aiming standard to another. First, the operator aligns the lens and reflective screen of the device with a vehicle headlight. Next, the intensity and beam pattern of the reflected headlight beam is measured by the light sensor. The comparator receives this intensity and beam pattern information and compares it to a known headlight aiming standard. This allows the operator to adjust the positioning of the headlight in order to properly aim the headlight.

The plug-in memory modules allow the operator to quickly and easily switch from one known standard to another. For example, if the operator wishes to switch from a U.S. standard to a European standard, he merely removes the plug-in module associated with the U.S. aiming standard from the socket of the comparator and plugs in the European standards module. With this construction, the operator does not have to access the internal circuitry of the comparator to switch standards, and thus can quickly and safely switch standards without taking the comparator apart.

Although the invention has been described with reference to the preferred embodiment illustrated in the attached drawings, it is noted that equivalents may be employed and substitutions made herein without departing from the scope of the invention as recited in the claims. For example, although the preferred headlight aiming apparatus is a Vision 1 system manufactured by Hopkins Manufacturing Corporation, various other headlight aiming configurations may be utilized with the present invention. One such headlight aiming apparatus measures a headlight by focusing the headlight on a screen placed approximately 25 feet in front of the vehicle. A TV camera is then focused on that screen to obtain an image of the headlight beam. Another headlight aiming apparatus measures the headlight beam with an array of light detectors spaced 25 feet from the vehicle. Another headlight aiming apparatus scans one or more light detectors in a plane spaced 25 feet from the vehicle.

Having thus described the preferred embodiments of the invention, what is claimed as new and desired to be protected by the Letters Patent includes the following:

1. An apparatus for aiming a light beam projected from a vehicle headlight, comprising:

means for sensing the light pattern and intensity of a lightbeam projected from a vehicle headlight; and a comparator coupled with said sensing means for comparing the light pattern and intensity of the lightbeam to a known headlight aiming standard;

said comparator including coupling means for coupling with at least one of a plurality of different types of plug-in modules selected from the group of a memory module configured for communicating a known headlight aiming standard to said comparator, a printer expansion module for coupling said comparator to a printer, a serial communication module for coupling said comparator to a computer device, a language module configured for communicating a known headlight standard written in a foreign language to said comparator, a demonstration module for coupling said comparator to a demonstration software program, and a training module for coupling said comparator to a training software program.

2. The apparatus as recited in claim 1, wherein said coupling means includes a plurality of externally-accessibly plug-in sockets for receiving said plug-in modules.

3. The apparatus as recited in claim 2, wherein said memory module includes a memory module encoded with said known headlight aiming standard.

4. The apparatus as recited in claim 4, including a plurality of plug-in memory modules for storing different known headlight aiming standards.

5. The apparatus as recited in claim 4, wherein said known headlight aiming standards include standards for automobiles driven in the U.S.

6. The apparatus as recited in claim 5, wherein said plurality of plug-in memory modules include a memory module for storing a known U.S. headlight aiming standard written in a variety of languages.

7. The apparatus as recited in claim 4, wherein said known headlight aiming standards include standards for automobiles driven in European countries.

8. The apparatus as recited in claim 4, wherein said known headlight aiming standards include standards for automobiles driven in Japan.

9. The apparatus as recited in claim 1, wherein said sensing means includes a reflective surface for receiving the light beam and for reflecting a reflected light therefrom, and a light 'sensor for measuring the reflected light's light pattern and intensity.

10. An apparatus for aiming a light beam projected from a vehicle headlight, comprising:

means for sensing the light pattern and intensity of a lightbeam projected from a vehicle headlight; and a comparator coupled with said sensing means for comparing the light pattern and intensity of the lightbeam to a known headlight aiming standard, said comparator including a housing presenting an exterior;

said comparator including means for receiving a plurality of memory modules containing said different known headlight aiming standards.

11. The apparatus as recited in claim 10, including a plurality of plug-in memory modules for storing a plurality of different known headlight aiming standards.

12. The apparatus as recited in claim 11, including a plug-in expansion module having a serial communications port, wherein said plug-in expansion module is operable to couple said comparator to other computer devices.

13. The apparatus as recited in claim 12, said comparator including a plurality of sockets for receiving said plug-in memory and expansion modules.

14. A method for aiming a vehicle headlight, comprising:

projecting a light beam from a vehicle headlight onto a reflective surface;

measuring the light pattern and intensity of said light beam;

providing a comparator for comparing the light pattern and intensity of said light beam to a known headlight aiming standard; and plugging in one of a plurality of different memory devices into said comparator for said comparing step.

15. An apparatus for aiming a light beam projected from a vehicle headlight, comprising:

a reflective surface for receiving the light beam and for reflecting a reflected light therefrom;

a light sensor for measuring the light pattern and intensity of said reflected light;

a comparator coupled to said light sensor for comparing the light pattern and intensity of said reflected light to a known headlight aiming standard, said comparator including a first EPROM memory device for storing a first known headlight aiming standard;

said comparator including a plurality of sockets for coupling with a plurality of different types of plug-in memory and expansion modules, wherein said plurality of different types of plug-in modules includes a memory module having a second EPROM memory device for storing a second known headlight aiming standard, wherein said second EPROM communicates with said first EPROM to substitute said second known aiming standard for said first aiming standard.

* * * * *